UNITED STATES PATENT OFFICE.

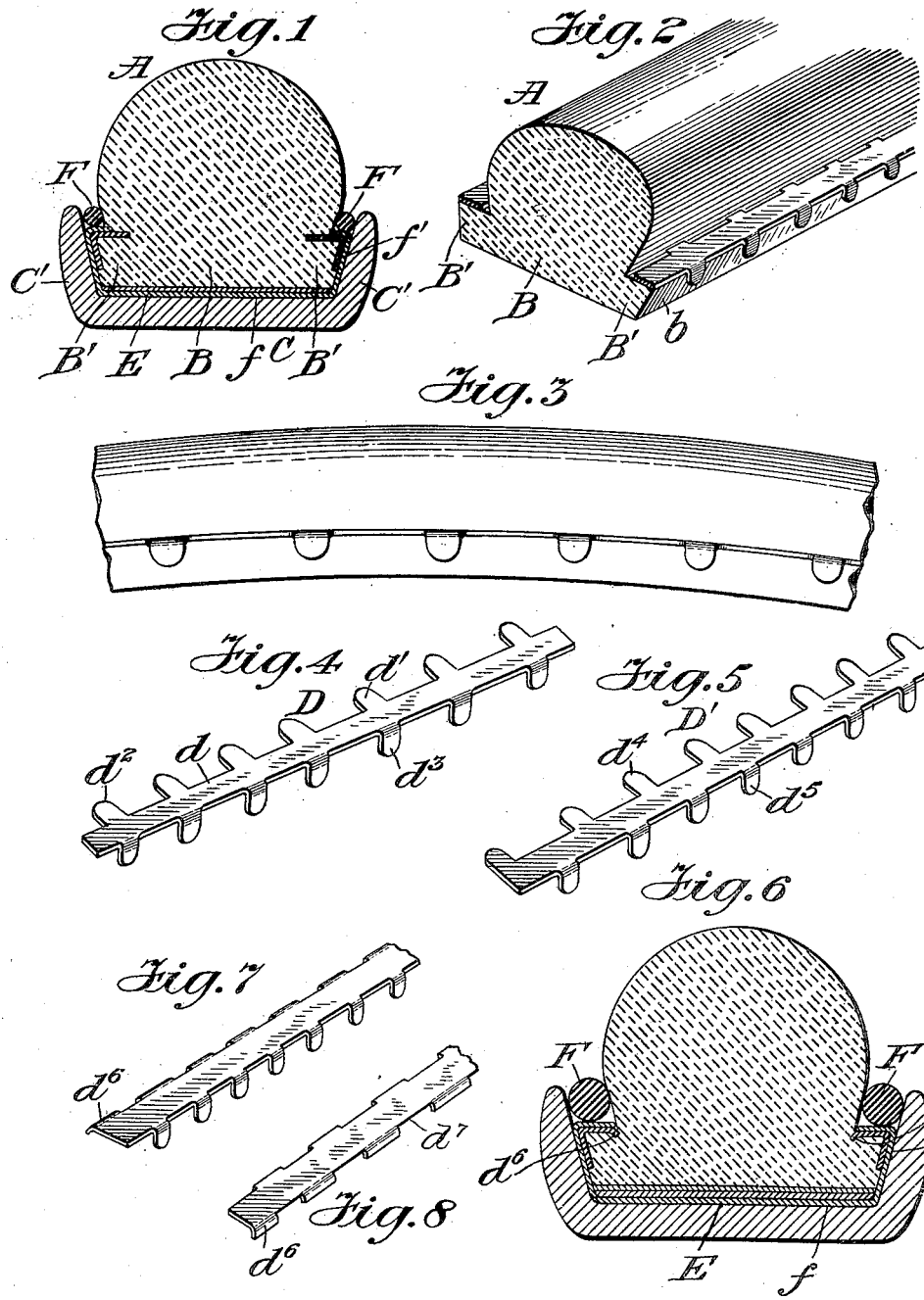

EDWIN B. CADWELL, OF NEW YORK, N. Y., ASSIGNOR OF ONE-THIRD TO FRANK JOHNSTON AND ONE-THIRD TO FRANK M. ASHLEY.

CUSHION-TIRE.

No. 827,784.  Specification of Letters Patent.  Patented Aug. 7, 1906.

Application filed November 12, 1903. Serial No. 180,826.

*To all whom it may concern:*

Be it known that I, EDWIN B. CADWELL, a citizen of the United States, and a resident of the city, county, and State of New York, have invented certain new and useful Improvements in Cushion-Tires, of which the following is a specification.

The present invention relates to cushion-tires for vehicle-wheels, and more especially to the type of tire designed to serve in connection with a rim having an outer circumferential depression, one of the prominent objects of the invention being novel metallic provision, conveniently and readily applied, for reinforcing and protecting those portions at the sides of the tire more nearly adjacent to the rim, whereby such portions are greatly strengthened, injury of the same through chafing with contiguous rim parts avoided, and facility for the positive securement of the tire in position promoted.

With the above and other purposes in view the invention comprises generally a tire of yielding material having engaged with the side portions of the same, contiguous to the rim, metallic sections, which in the case of tires having inner lateral shoulders embrace the same both on their outer and side surfaces, and thereby result in said metallic sections efficiently performing the functions for which they are designed.

The metallic sections arranged in the manner stated are so conditioned that they will permit flexing movements of the tire proper involved in the operations of the adjusting and removing of the same with respect to the rim. Furthermore, such metallic sections present highly-serviceable side bearings for permitting annularly-disposed wires to positively clamp the tire in position.

There are other important features connected with the invention, which, besides those alluded to, are clearly set forth in the subsequent detailed description.

In the accompanying drawings, forming part of this specification, Figure 1 is a vertical cross-sectional view of a wheel-rim and tire, disclosing certain features of my invention. Fig. 2 is a perspective view of a portion of the tire and illustrating the character and relation of the metallic sections or strips. Fig. 3 is a side view of the parts represented in the preceding figure. Fig. 4 is a perspective view showing a portion of one of the metallic sections or strips detached. Fig. 5 is a somewhat similar view disclosing a slightly-modified form of section or strip. Fig. 6 is a vertical cross-sectional view of a wheel-rim and tire and illustrating another embodiment of the invention. Figs. 7 and 8 are perspective views showing in relatively reversed positions the form of metallic section or strip employed in the construction represented in Fig. 6.

Similar reference characters are employed to designate corresponding parts in the several figures of the drawings wherein they occur.

In the type of the invention disclosed in Figs 1 to 4, inclusive, A refers to a yielding tire, which may be of any desired form and construction and embodying a base B, which latter is laterally extended to present the longitudinally-disposed annular shoulders B' B', which, with the rest of the base, are adapted to occupy a position within the circumferential channel or depression of the rim C of the wheel, which channel or depression is formed by providing said rim with integral flanges C' C', the inner surfaces of which outwardly incline. The side edges $b$ of the shoulders B' are preferably under-beveled to adapt them for conforming with the inner surfaces of the rim-flanges and for a further purpose that will presently appear.

Before the introduction of the tire A into position said tire has applied to both shoulders B' B' sections D, each being of a metal—as, for instance, sheet metal—possessing sufficient malleability to permit the sections to readily accommodate themselves to the flexing movements to which the tire is ordinarily subjected during its adjustment and removal. Each section D comprises a longitudinal thin flat band or strip $d$, integrally projecting from the inner edge of which are a series of transversely-disposed horizontal spurs $d'$, which also partake of the thin and flat character of the band or strip $d$ and which also for the sake of uniformity may be mutually equidistantly located. The inner extremities $d^2$ of these spurs are shown in Fig. 4 as being horizontally rounded. Integrally at the outer edge of each section are correspondingly-located spurs $d^3$, which are turned at their connections with the strip, so as to depend therefrom more desirably at an angle corresponding with that of the beveled edges of the shoulders b of the tire. These sections D are applied to the tire, as indicated most clearly in Figs. 1, 2, and 3, so that the spurs $d'$ penetrate and become embedded in the material of the tire, and thus contribute to retain the strip $d$ in a position resting on the top of the shoulder B' to which it pertains. The insertion of the spurs $d'$ is so conducted that besides resulting in the strip $d$ resting upon the shoulder-top, as stated, the outer depending spurs $d^3$ will be brought in intimate bearing-contact with the beveled edge of the shoulder, such pressure being exerted, if necessary, as will cause the spurs $d^3$ to occupy the shallow indentations they make in the material forming the shoulder.

The tire equipped as thus explained can be adjusted so that its base will occupy the rim depression, under which conditions the sections D D at each side will reinforce the shouldered portions B' B', while the depending ears $d^3$ will, by reason of their apposite relation with respect to the rim-flanges, protect the shoulders from the chafing action to which they might otherwise be liable.

The metallic provision at each side of the tire may be in the form of a continuous thin band or strip having the horizontal and depending spurs on its inner and outer edges, respectively. I prefer, however, that the provision at each side shall comprise a series of consecutively-disposed metal sections each comparatively short in length and embodying the thin band and spurs, as will be readily understood. This arrangement will permit the degree of flexibility of each metal section to be materially increased, as sufficient yield will be afforded at the section ends to permit the tire to partake of the requisite flexibility.

The character and disposition of the sections D when in position are such that said sections act to maintain the shouldered portions B' normal, and thus obviate any tendency of said portions buckling or assuming other irregular condition between the rim-flanges. Moreover, the tire is braced against undue torsional yield.

In Figs. 1 and 6 the tire is shown as having a strengthening-backing E, of fabric, attached thereto, preferably by incorporating the same with the rubber of the tire and vulcanizing the whole together when the tire is formed. I prefer to form this backing of a plurality of layers of canvas, and, if desired, these may be in the form of long strips relatively superposed. When binding-wires F F are employed, it will be advantageous to make the bottom canvas layer $f$ sufficiently wide to provide lateral extensions $f'$, which can be folded over upon the strips $d$ of the metallic sections, and thus constitute a thin friction-pad between the wires and sections, besides contributing to the secure binding of the parts together. From this it will be appreciated that the sections D, through the medium of their strips $d$, present highly satisfactory bearings for the wires F F.

The character of the sections D may be varied. The spurs $d'$, instead of being in transverse alinement with the spurs $d^3$, as shown in Figs. 1, 2, and 3, may be in alternate relation, as are the spurs $d^4$ $d^5$, in the form illustrated in Fig. 5, which will have the function of more uniformly distributing the engaging portions of the sections D' thus presented. In lieu of pronounced spurs at the inner side of each section the engaging provision thereat may be presented by downwardly curving the inner edge portion of the strip, as indicated at $d^6$ in Figs. 6, 7, and 8, and with a view of augmenting the engaging quality of said portion the metal forming the latter may be intermittently cut away or removed, as indicated at $d^7$, which will also have the effect of rendering the section more flexible than if the curve $d^6$ were continuous.

It will be apparent that the metal sections can be readily and cheaply produced in large quantities and that when combined with a tire will confer numerous advantages not heretofore attained in so efficient and simple a manner.

I do not desire to be understood as limiting myself to the particular constructions and arrangements of parts shown and described, but reserve the right to all modifications within the scope of my invention.

Having now described my invention, what I claim as new, and desire to secure by Letters Patent, is—

1. A tire of flexible material having its rim portion at each side equipped with a longitudinally-extended metal strip with inner provision embedded in the tire material and a plurality of outer spurs in bearing contact with the tire-surface, said metal strips constituting components of the tire before the application of the latter to a wheel-rim.

2. A tire of flexible material having its rim portion at each side equipped with a longitudinally-extended flat metal strip provided at its inner edge with a plurality of spurs embedded in the tire material, and at its outer edge with a plurality of angularly-disposed spurs.

3. The combination with the rim, of the tire of flexible material with lateral shoulders, metal sections engaged with and carried by said shoulders and binding-wires confining said metal sections.

4. The combination with the rim, of the tire of flexible material with lateral shoulders, a metal section engaged with and carried by each shoulder, the section at one side being independent of that at the other side, and binding-wires confining said metal sections.

5. The combination with the rim, of the tire of flexible material, of metal sections engaged with the rim portions of the tire, a fabric backing for the latter and having lateral extensions folded over upon the sections and binding-wires bearing upon the upper portions of the extensions.

6. The combination with the rim provided with side flanges, of a tire of yielding material having a base presenting lateral shoulders located between the rim-flanges, metal strips upon the shoulders and having inner spurs embedded in the tire, said strips also with outer depending spurs bearing against the side edges of the shoulders, and binding-wires confining said strips and shoulders.

7. The combination with the rim provided with side flanges, of a tire of yielding material having a base presenting lateral shoulders located between the rim-flanges, metal strips upon the shoulders and having spurs engaged with the tire, a canvas layer combined with the tire and provided with lateral extensions folded over upon the metal strips, and binding-wires bearing on the upper folded portions of the canvas layer.

In testimony whereof I have signed my name to this specification in the presence of two subscribing witnesses.

EDWIN B. CADWELL.

Witnesses:
WILLIAM PAXTON,
PHILIP K. STERN.